(12) United States Patent
Jarsaillon et al.

(10) Patent No.: US 7,938,367 B2
(45) Date of Patent: May 10, 2011

(54) STRINGERS ASSEMBLED AT A CIRCUMFERENTIAL JOINT OF AN AIRPLANE FUSELAGE

(75) Inventors: Guillaume Jarsaillon, Toulouse (FR); Fabrice Dubois, Tournefeuille (FR)

(73) Assignee: Airbus France, Toulouse (FR)

( * ) Notice: Subject to any disclaimer, the term of this patent is extended or adjusted under 35 U.S.C. 154(b) by 624 days.

(21) Appl. No.: 11/966,462

(22) Filed: Dec. 28, 2007

(65) Prior Publication Data

US 2008/0210819 A1 Sep. 4, 2008

(30) Foreign Application Priority Data

Jan. 2, 2007 (FR) ...................................... 07 52500

(51) Int. Cl.
*B64C 1/06* (2006.01)
(52) U.S. Cl. ........................ 244/131; 244/119; 244/120
(58) Field of Classification Search .................. 244/131, 244/119, 120, 124, 132; 52/655.1, 653.1, 52/713, 223.12, 245, 506.07, 665
See application file for complete search history.

(56) References Cited

U.S. PATENT DOCUMENTS

| 2,382,358 | A | * | 8/1945 | Watter ........................... 244/131 |
| 2006/0060705 | A1 | | 3/2006 | Stulc et al. |
| 2008/0067289 | A1 | * | 3/2008 | Meyer .......................... 244/131 |

FOREIGN PATENT DOCUMENTS

| EP | 1081043 | A | | 3/2001 |
| FR | 0048191 | A1 | * | 8/1981 |
| GB | 524721 | | * | 2/1939 |
| GB | 573725 | | * | 12/1945 |
| GB | 2196923 | A | | 5/1988 |
| WO | 9858759 | A | | 12/1998 |
| WO | 03085146 | A | | 10/2003 |

\* cited by examiner

*Primary Examiner* — Joshua J Michener
(74) *Attorney, Agent, or Firm* — Perman & Green, LLP

(57) ABSTRACT

The disclosed embodiments relate to an airplane fuselage produced by assembling, at a circumferential joint, at least two sections including a skin and at least one stringer split into two elements and which are assembled at the joint between the two sections by at least one splicing plate. The splicing plate includes a web having a bearing surface including two surfaces bearing on lateral faces of the elements of the stringer, the two surfaces being offset by an amount $\epsilon$ substantially equal to an error of alignment between the lateral faces of the elements of the stringer.

7 Claims, 3 Drawing Sheets

COUPE A-A

SECTION ON A-A     Fig. 2c

STRINGERS ASSEMBLED AT A CIRCUMFERENTIAL JOINT OF AN AIRPLANE FUSELAGE

CROSS-REFERENCE TO RELATED APPLICATIONS

This application claims priority to and the benefit of French Application No. 07 52500 filed on 2 Jan. 2007, the disclosures of which are incorporated by reference in its entirety.

The disclosed embodiments relate to the field of circumferential joints between two sections of an airplane fuselage. More specifically, the disclosed embodiments relate to the assembling of the stringers of two sections using splicing plates at said circumferential joint.

BACKGROUND

An airplane fuselage is a lightweight structure usually consisting of a skin supported internally by reinforcing frames and stringers to form a rigid shell. The reinforcing frames are positioned along cross sections of the fuselage which are substantially perpendicular to a longitudinal axis of the fuselage and the stringers run along the longitudinal axis. Over one section of a fuselage, of the order of 5 m in diameter, such as that of a jumbo jet, the number of stringers may be as high as 100 or more.

When the fuselage is produced by assembling several sections, two elements that form a stringer, situated facing one another in each section, have to be joined together in order to provide the structural continuity of the stringer and transmit longitudinal loads.

To assemble two stringer-forming elements, one known solution is to use a splicing plate. Said splicing plate bears against the elements which face one another in each section and is assembled and fixed to the elements using fasteners such as rivets.

Because of the manufacturing tolerances, it is not generally possible to guarantee perfect alignment between the two elements of one and the same stringer in the case of all the stringers of the two sections over an entire cross section.

When the two stringer-forming elements are riveted elements $2a$, $2b$ as they are in FIGS. $1a$ and $1b$, that is to say when they are fixed by means of rivets to a skin $61a$, $61b$ of the fuselage, one solution, when producing the section, is not to complete the assembly, on the skin $61a$, $61b$, respectively, of the ends $25a$, $25b$ situated at the circumferential joint $5$ of each stringer-forming element $2a$, $2b$ over a distance of some ten centimeters for example. Thus, upon assembly, the stringer-forming elements $2a$, $2b$ can be deformed slightly, within the elastic domain, on each side of the joint $5$ to make said elements align and so that the splicing plate $1$ can be fitted to ensure the structural continuity of this stringer before the elements $2a$, $2b$ are definitively fixed to the skin $61a$, $61b$.

When at least one of the stringer-forming elements is fixed to the skin of the fuselage with no possibility of repositioning it on the skin during assembly of the two sections, as for example in the case of a welded element or a bonded element, the aforementioned solution can no longer be envisioned because said element can no longer be deformed in order to correct the misalignment.

One known solution is to use a packing piece $8$ to compensate for the misalignment distance. Once the two sections have been positioned, some elements $2a$, $2b$ of one and the same stringer have a variable offset $\epsilon$. The offset $\epsilon$ is measured and the packing piece $8$, produced to a thickness substantially equal to the offset $\epsilon$, is inserted between one of the two elements and the splicing plate $1$, as illustrated in FIG. $1c$, so that said splicing plate rests on a substantially flat surface of both elements $2a$, $2b$.

However, the use of the packing piece entails, on the one hand, the addition of an extra part, namely the packing piece, with the possible risks of incorrect positioning and, on the other hand, the fact that there is a packing piece being used leads to an increase in the peening of the fastenings, because of the distance between the element and the splicing plate. In addition, the packing piece introduces an additional interface thus increasing the risk of corrosion.

SUMMARY

The disclosed embodiments propose an assembly of stringers, at a circumferential joint, using a splicing plate which compensates for the offset between two stringer-forming elements without the need to add and handle an additional part while at the same time reducing the peening within said assembly.

According to the disclosed embodiments, an airplane fuselage produced by assembling, at a circumferential joint, at least two sections comprises a skin and at least one stringer split into two elements which are assembled at the joint between said two sections by at least one splicing plate said splicing plate comprising a web having a bearing surface comprising two surfaces bearing on lateral faces of the elements of the stringer, said two surfaces being offset by an amount $\epsilon$ substantially equal to an error in alignment between the lateral faces of said elements of the stringer.

In one embodiment, at least one element of the stringer is fixed to the skin of the fuselage without the possibility of repositioning it on the skin during the operations of assembling the two sections. The at least one element may be an element riveted over its entire length, a welded element or a bonded element.

In one exemplary embodiment, the web of the splicing plate comprises a flat surface on the opposite side to the bearing surface.

In another exemplary embodiment, in order not to increase the mass of the splicing plate and in order to use fastenings of equal lengths, the web of the splicing plate is of constant thickness.

BRIEF DESCRIPTION OF THE DRAWINGS

The detailed description of a stringer assembled at a circumferential joint is given with reference to the figures which depict:

FIG. $1a$, already mentioned: a perspective view of a stringer using a splicing plate according to the prior art;

Figure 3A:
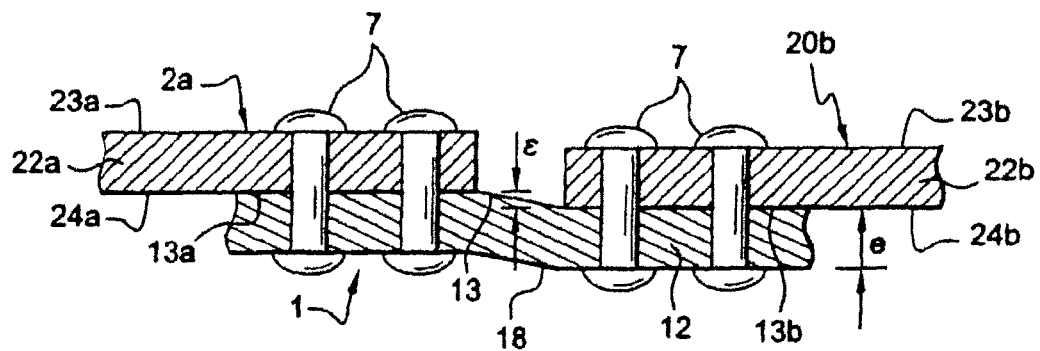
Figure 3A:
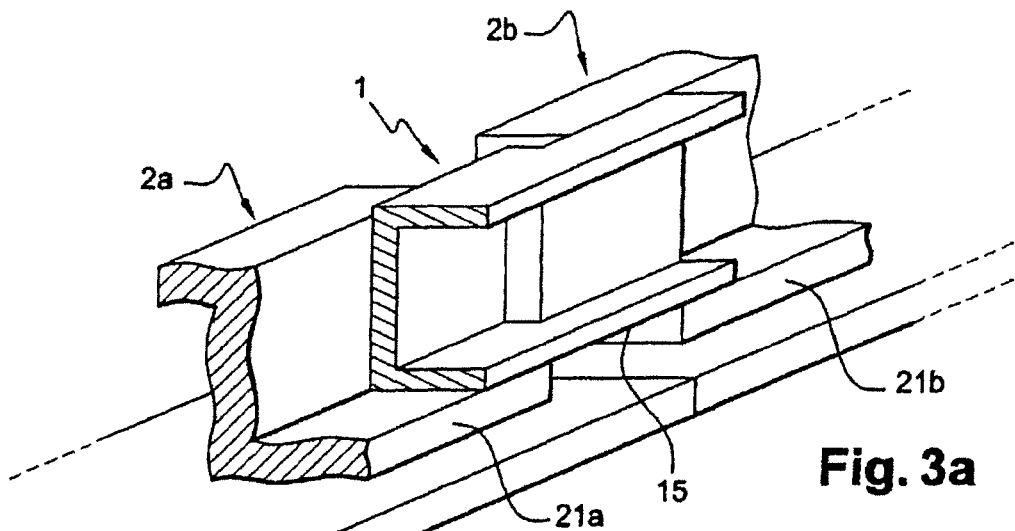
Figure 3B:
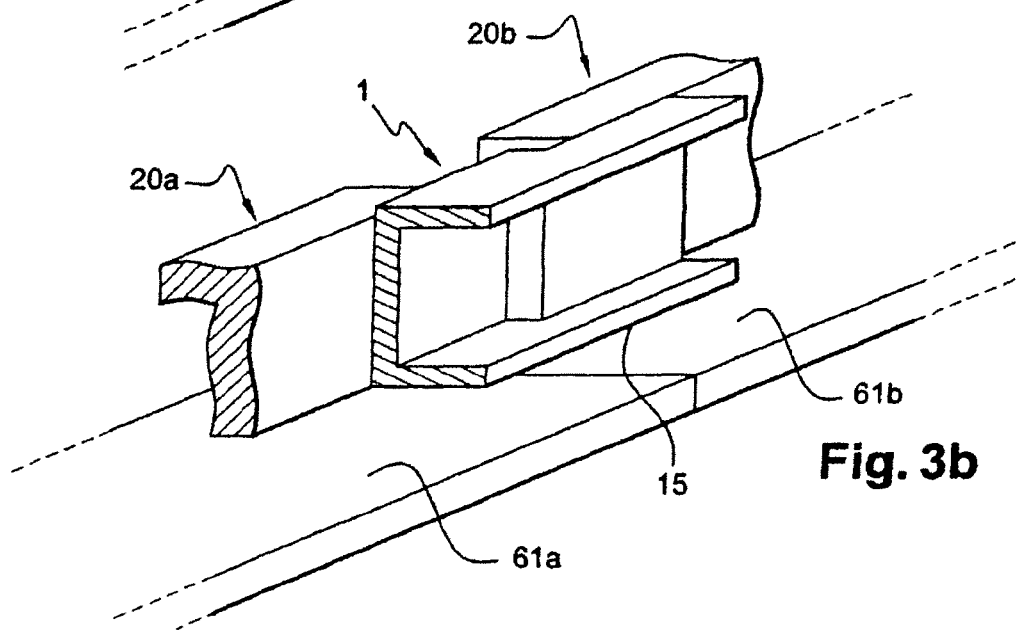

FIG. $1b$, already mentioned: a cross section of an assembled stringer of FIG. $1a$;

FIG. $1c$, already mentioned, a cross section of an assembled stringer comprising two offset elements and a packing piece, according to the prior art;

FIG. $2a$, a schematic view of an airplane fuselage prior to the assembly of the sections and comprising stringers;

FIG. $2b$, a perspective view of an assembled stringer comprising two offset elements, one of which is a welded element, assembled using a splicing plate according to the disclosed embodiments;

FIG. $2c$, a cross section through an assembled stringer comprising two offset elements, as per FIG. $2a$;

FIG. $3a$, a perspective view of an assembly of a stringer comprising two offset elements using a splicing plate according to the disclosed embodiments, with two riveted elements or two bonded elements or one bonded element and one riveted element;

FIG. 3b, a perspective view of a stringer, comprising two offset elements, which is assembled using a splicing plate according to the disclosed embodiments, with two welded elements.

DETAILED DESCRIPTION

Figure 1A:
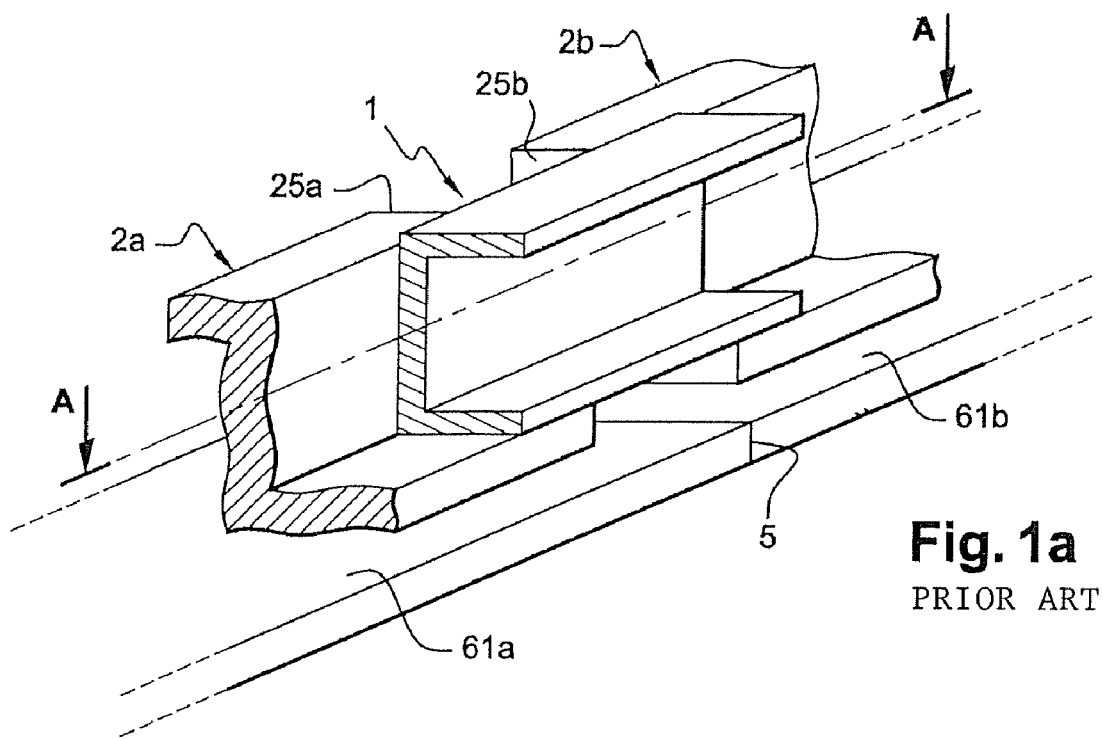
Figure 1B:
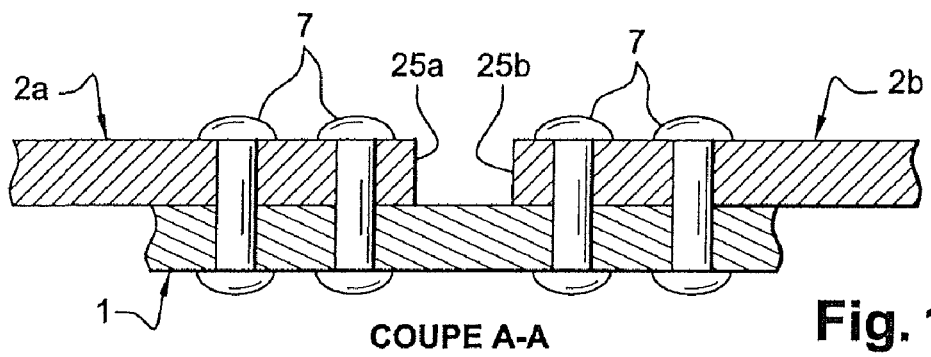
Figure 1C:
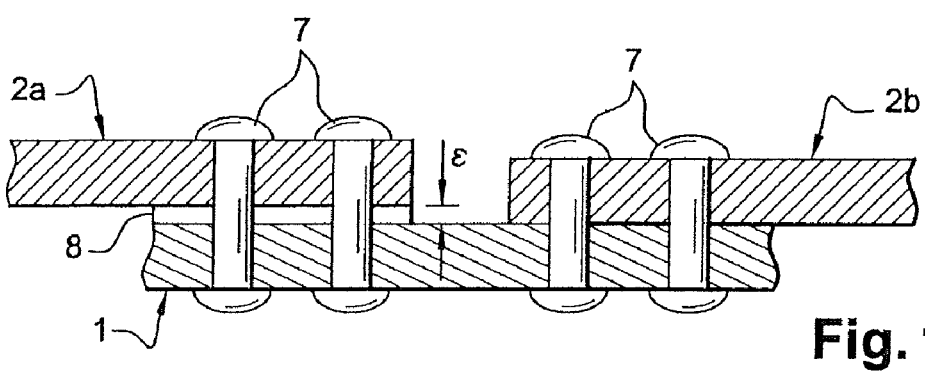
Figure 2A:
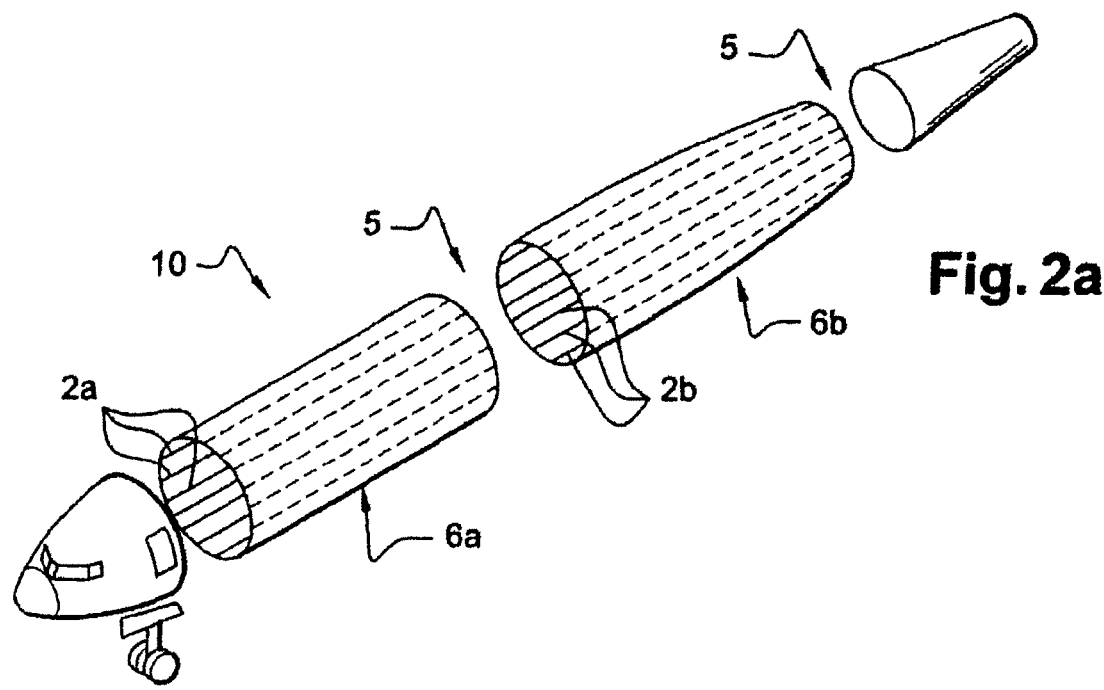

A substantially cylindrical airplane fuselage 10 as illustrated in FIG. 2a comprises a skin to which are attached stringers 2a, 2b which run substantially parallel to the generatrices of the fuselage and which contribute toward the rigidity of the skin of the fuselage.

Said fuselage 10 is produced by assembling at least two sections 6a, 6b at circumferential joints 5.

Figure 2B:
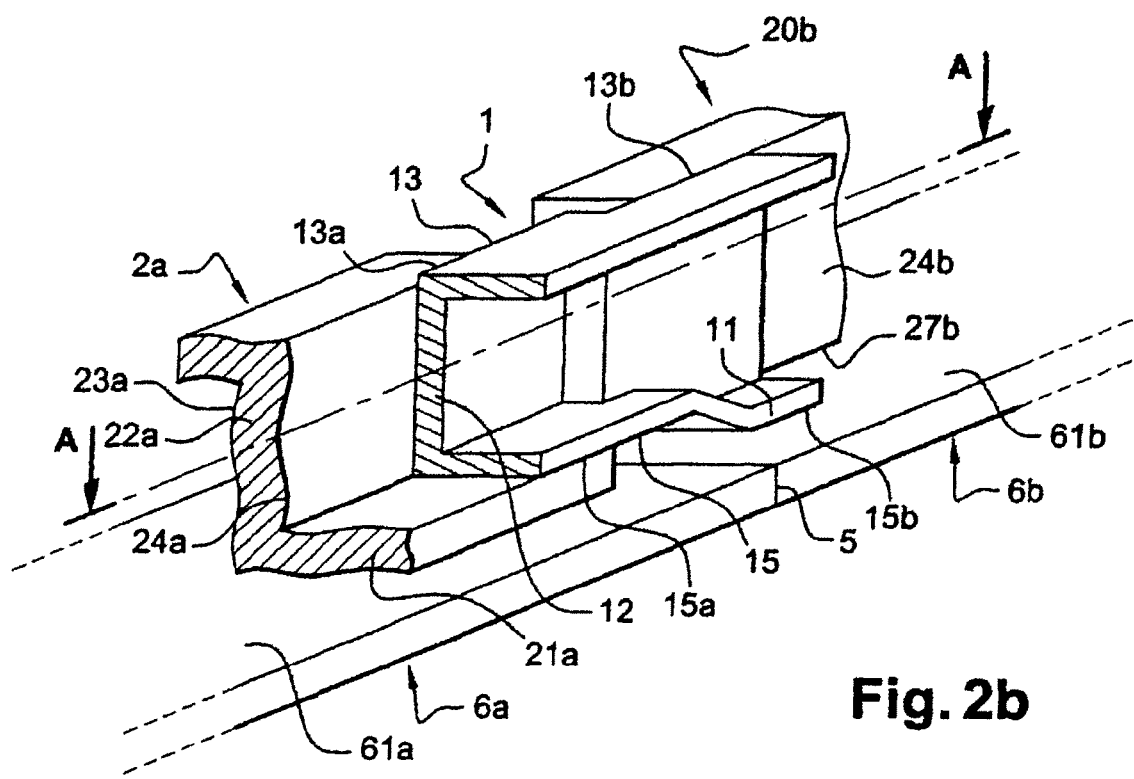

At a circumferential joint 5, as illustrated in FIG. 2b, two stringer-forming elements 2a, 20b lie facing one another and extend over each section 6a, 6b, respectively. Said two elements are assembled using a splicing plate 1 bearing on lateral faces 24a, 24b of the elements 2a, 20b to provide the structural continuity of the stringer.

In the exemplary embodiment illustrated in FIGS. 2b and 2c, the assembling of a stringer, at a circumferential joint 5 between the two sections 6a, 6b of an airplane fuselage 10, is described in the case of a riveted element 2a on one section 6a facing a welded element 20b on the second section 6b, without this choice in any way restricting the disclosed embodiments. Use of the disclosed embodiments can be adapted to suit all stringers of the fuselage 10 and all stringer-forming elements.

The riveted element 2a has a cross section known as Z-section and comprises a flange 21a and a web 22a comprising lateral faces 23a, 24a substantially perpendicular to said flange. Said riveted element is fixed, by riveting, to a skin 61a of the fuselage of the section 6a via said flange.

The welded element 20b has an inverted L-shaped cross section and comprises a web 22b comprising lateral faces 23b, 24b and is fixed substantially perpendicular to the skin 61b of the fuselage of the section 6b via a weld at one edge 27b of the element 20b.

Said welded element is fixed to the skin of the fuselage without any possibility of its being repositioned on said skin during assembly of the two sections.

Because of the manufacturing tolerances, the two elements 2a and 20b facing one another on each section 6a, 6b are not, at the lateral faces 24a and 24b of the webs 22a, 22b, in line with one another in the longitudinal direction, but exhibit a transverse offset $\epsilon$ between the lateral faces 24a and 24b of the webs 22a, 22b of the two elements 2a, 20b. As illustrated in FIG. 2c, the splicing plate comprises a bearing face 13 which has an offset substantially equal to the offset $\epsilon$ between the lateral faces 24a and 24b of the two elements 2a, 20b and is mounted bearing against said lateral faces of the two elements 2a, 20b in such a way that the bearing face 13 of the splicing plate is in perfect contact with the bearing surfaces 24a, 24b of said elements.

In the example of FIGS. 2b, 2c, the splicing plate 1, which has a substantially C-shaped cross section, comprises a web 12 with a bearing surface 13 and a flange 11 with a bearing surface 15. The bearing surface 15 bears on the skin 6b and the flange 21a of the riveted element 2a and the bearing surface 13 bears on the webs 24a, 24b of the elements 2a, 20b of the stringer. The two bearing surfaces 13, 15 are assembled with the elements and/or with the skin by means of fastenings, such as rivets 7 for example.

The splicing plate 1 extends over enough of the length of each element 2a, 20b that it can be fixed to each element and react to tensile/compressive loads.

To compensate for the offset $\epsilon$, the bearing surface 13 of the splicing plate 1 is not flat. It has at least two mutually offset surfaces 13a, 13b. This offset corresponds substantially to the magnitude $\epsilon$ of the offset between the two elements 2a, 20b such that the bearing surface 13a of the splicing plate 1 bears on the lateral face 24a of the flange 22a of the riveted element 2a and the bearing surface 13b bears against the lateral face 24b of the web 22b of the welded element 20b without there being any need to alter the position of said elements and without introducing any stress when assembling the elements.

As a preference, an incline plane is produced between the surfaces 13a, 13b of the splicing plate 1 in order to provide a safe path for transmitting loads along the length of the splicing plate.

In one exemplary embodiment, the web of the splicing plate is not of constant thickness. A surface 18 of the web 12, on the opposite side to the bearing surface 13, is flat.

In the exemplary embodiment of FIG. 2c, the web 12 of the splicing plate is machined in such a way as to obtain a constant thickness e, the surface 18 of the web 12 on the opposite side to the bearing surface 13 having a profile equivalent to the bearing surface 13. A splicing plate such as this is advantageously used if the offset $\epsilon$ is such that it entails fasteners of different lengths or a penalizing additional mass.

At the flange, the bearing surface 15 of the splicing plate is not flat but has two mutually offset surfaces 15a, 15b which are offset in such a way that the surface 15a bears against the flange 21a of the riveted assembly 2a and the surface 15b bears against the skin 61b of the fuselage of the section 6b because there is no flange for the welded element 20b. As a preference, an inclined plane is produced between the surfaces 15a, 15b to make it easier for load to be transmitted between said two surfaces. This discontinuity is of a size substantially equal to the thickness of the flange 21a of the riveted element 2a. The flange 11 of the splicing plate 1 is machined in such a way that it has a constant or non-constant thickness.

The disclosed embodiments are not restricted to assembling a riveted element 2a and a welded element 20b. The elements may be fixed to the skin of the fuselage by other means, for example by bonding. Those skilled in the art will be capable of adapting the shape of the splicing plate to suit assembly of two stringer elements of any cross section, at least one of which is fixed permanently to the skin.

In one exemplary embodiment, where the two elements each have a flange, for example two elements 2a and 2b riveted along their entire length as illustrated in FIG. 3a, or two bonded elements or one riveted element and one bonded element, and when the flanges 21a, 21b have a comparable or very similar thickness, the bearing surface 15 of the splicing plate 1 is flat. Said bearing surface is positioned on the flange 21a, 21b of each element 2a, 2b.

In another exemplary embodiment when two elements have no flange, for example in the case of two welded elements 20a, 20b as illustrated in FIG. 3b, the bearing surface 15 is machined to match the profile of the skins 61a, 61b and is fixed entirely to the skins 61a, 61b of the fuselage of the sections 6a, 6b.

When a splicing plate 1 is produced, the splicing plate is machined in such a way as to reproduce the surface 13 that has the measured offset $\epsilon$ between the two surfaces 13a, 13b of the two elements 2a, 20b.

In order to avoid having to machine each splicing plate to suit, it is advantageous to have prefabricated splicing plates available that have different offset sizes $\epsilon_{splice}$.

In practice, a structural assembly is able to tolerate an alignment error. For example, on a typical stringers assembly in an airplane fuselage, an alignment error of magnitude $\delta$ of the order of three tenths of a millimeter is commonly permitted. The manufacture of splicing plates which have offsets $\epsilon_{splice}$ in increments smaller than $\delta$ is therefore unnecessary. Hence, in practice, it is sufficient to have prefabricated splicing plates produced to have an offset $\epsilon_{splice}$ that varies in increments of two $\delta$ (for example: 0, 2$\delta$, 4$\delta$, 6$\delta$, −2$\delta$, −4$\delta$ . . . ). Upon assembly, when the value $\epsilon$, which is measured between two stringers, is measured, the prefabricated splicing plate 1 that has the offset $\epsilon_{splice}$ closest to the measured value $\epsilon$ is used for the assembly. The difference between $\epsilon_{splice}$ and $\epsilon$ is always less than $\delta$.

The disclosed embodiments therefore make it possible to obtain an assembly of stringers, at a circumferential joint in an airplane fuselage, using a splicing plate which compensates for the misalignment between the stringer-forming elements without entailing the use of an additional packing piece. Said splicing plate thus makes it possible to reduce the peening of the fastenings in the assembly and give said assembly better fatigue behavior.

The invention claimed is:

1. An airplane comprising:
 a fuselage having at least first and second sections connected at a circumferential joint wherein each of the sections comprise a skin and at least one stringer, the stringers extending parallel to a longitudinal axis of the fuselage, each of the stringers further comprising:
 a lateral surface, wherein, in the assembled position, the lateral surface of the stringer of the first section is out of alignment with the lateral surface of the stringer of the second section at the joint, by an alignment error $\epsilon$;
 at least one splicing plate constructed to connect the stringers at the joint of said first and second sections, the splicing plate further comprising:
 a web having a first bearing surface bearing on the lateral face of the stringer of the first section and a second bearing surface bearing on the lateral face of the stringer of the second section, wherein the first and second bearing surface of the splicing plate web are connected by an inclined plane that is constructed to offset the first bearing surface from the second bearing surface by a distance $\epsilon$ substantially equal to the error of alignment between the lateral faces of the stringers.

2. The airplane fuselage according to claim 1, in which the stringer is fixed to the skin of the fuselage.

3. The airplane according to claim 2, in which the stringer is fixed to the fuselage by rivets.

4. The airplane according to claim 2, in which the stringer is a-fixed to the fuselage by welding.

5. The airplane according to claim 2, in which the stringer is fixed to the fuselage by bonding.

6. The airplane according to claim 1, in which the web of the splicing plate comprises a flat surface on the opposite side to the bearing surface.

7. The airplane according to claim 1, in which the web of the splicing plate is of constant thickness.

\* \* \* \* \*

UNITED STATES PATENT AND TRADEMARK OFFICE
CERTIFICATE OF CORRECTION

PATENT NO. : 7,938,367 B2  
APPLICATION NO. : 11/966462  
DATED : May 10, 2011  
INVENTOR(S) : Jarsaillon et al.

Page 1 of 1

It is certified that error appears in the above-identified patent and that said Letters Patent is hereby corrected as shown below:

Column 6, line 17, Claim 2, after "airplane" delete "fuselage".

Column 6, line 22, Claim 4, delete "a-fixed" and insert -- fixed --, therefor.

Signed and Sealed this
Third Day of January, 2012

David J. Kappos
*Director of the United States Patent and Trademark Office*